(12) United States Patent
Bertini

(10) Patent No.: US 6,428,071 B2
(45) Date of Patent: Aug. 6, 2002

(54) GRIPPER WITH ENHANCED OPENING RANGE

(76) Inventor: Millo Bertini, 679 Garden St., Trumbull, CT (US) 06611

( * ) Notice: Subject to any disclaimer, the term of this patent is extended or adjusted under 35 U.S.C. 154(b) by 0 days.

(21) Appl. No.: 09/808,266

(22) Filed: Mar. 14, 2001

Related U.S. Application Data

(60) Provisional application No. 60/192,225, filed on Mar. 27, 2000.

(51) Int. Cl.$^7$ .................................................. B25J 15/08
(52) U.S. Cl. ........................ 294/119.1; 294/88; 901/37
(58) Field of Search ............................... 294/119.1, 88; 901/36, 37; 269/27, 32, 34

(56) References Cited

U.S. PATENT DOCUMENTS

| | | | |
|---|---|---|---|
| 1,089,362 A | * 3/1914 | Hannifin ..................... 279/117 |
| 2,757,391 A | * 8/1956 | Stottlemyer ................. 296/216 |
| 4,336,926 A | * 6/1982 | Inagaki et al. .............. 269/218 |
| 4,593,948 A | 6/1986 | Borcea et al. |
| 4,707,013 A | * 11/1987 | Vranish et al. ........... 294/119.1 |
| 4,741,568 A | 5/1988 | Borcea et al. |
| 4,852,928 A | * 8/1989 | Monforte ................. 294/119.1 |
| 4,874,194 A | 10/1989 | Borcea et al. |
| 5,125,708 A | 6/1992 | Borcea et al. |
| 5,163,729 A | 11/1992 | Borcea et al. |
| 5,529,359 A | 6/1996 | Borcea et al. |
| 5,572,915 A | 11/1996 | Bertini |
| 5,954,320 A | * 9/1999 | Bohler ....................... 269/240 |
| 5,967,581 A | 10/1999 | Bertini |
| 6,003,431 A | 12/1999 | Bertini |

* cited by examiner

*Primary Examiner*—Dean J. Kramer
(74) *Attorney, Agent, or Firm*—Fattibene & Fattibene; Arthur T. Fattibene; Paul A. Fattibene

(57) ABSTRACT

A power gripper for a machine or robotic tool having a housing provided with a cylinder and piston for actuating a pair of finger carriers slidably mounted on the housing to reciprocate between open and closed positions wherein the range of opening is enhanced for a gripper of a given size. This is attained by the piston rod having a rack portion meshing with an idler pinion that is in meshing relationship with a rack formed on one of the finger carriers whereby the latter is synchronized relative to the movement of the piston. The other finger carrier is pinned to the piston to move therewith. In one form of the invention, a fluid pressure acting on the opposed ends of the piston effects the drive of the piston in either direction. In another form of the invention, a fluid pressure is imparted on one end of the piston only and which piston is spring biased to effect the drive of the piston in the opposite direction.

9 Claims, 2 Drawing Sheets

GRIPPER WITH ENHANCED OPENING RANGE

RELATED APPLICATION

This application relates to provisional application S.N. 60/192,225 filed Mar. 27, 2000 for Gripper With Enhanced Opening Range.

FIELD OF THE INVENTION

This invention relates to grippers and more specifically to parallel type grippers for use with a machine tool or robotic machines.

BACKGROUND OF THE INVENTION

Various constructions of mechanical grippers for use with machine tools and/or robotic tools for holding and/or locating a work piece are known. Such known grippers have been disclosed in various U.S. Patents, e.g. U.S. Pat. Nos. 4,593,948; 4,741,568; 4,874,194; 5,125,708; 5,163,720; 5,529,359; 5,572,915; 5,976,581 and 6,003,431. While these known grippers are useful for their intended purposes, there still persists certain problems and/or deficiencies, e.g. increasing and/or enhancing the range of movement between the open and closed position of the gripper fingers for a given size gripper housing or envelope. In other words, that the range between the open and closed positions of the gripper fingers is greater than that of a known gripper of equal size.

SUMMARY OF THE INVENTION

A feature of this improved gripper resides in providing a gripper of a given envelope size, i.e. housing, having a greater range of movement between an opened and closed position of the gripper fingers carried thereon. In other words, the range between the open and closed position is greater than that of a known unit of equal size.

Another feature resides in the provision that the gripper disclosed herein is relatively simple and economical to fabricate.

The foregoing features, objects and other advantages of this invention are attained by a gripper that includes a housing having a cylinder bore extending therethrough which is sealed on the opposite ends thereof. A piston is slidably disposed within said cylinder bore for reciprocating therein. In one form of the invention, the piston is activated to reciprocate in either direction by fluid pressure, e.g. compressed air. In another form of the invention, the piston is fluid activated in one direction and spring biased to shift the piston in the opposite direction.

In either event, the housing is provided with a cruciform slot extending parallel to the axis of the cylindrical bore. A pair of cruciform finger carriers are reciprocally mounted within the cruciform slot to slide between an open and closed position. A suitable gripper finger is carried on each of the finger carriers which are arranged to grip a work piece therebetween.

In accordance with this invention, one of the finger carriers is provided with a rack disposed in meshing relationship to an idler gear rotatably journaled within the housing between the piston and the rack of the finger carrier. The piston is also provided with a rack disposed in meshing relationship with the idler gear.

The other finger carrier is pinned to the piston at a point longitudinally spaced from the axis of rotation of the idler gear. The arrangement is such that the finger carriers and the fingers carried thereby are shifted between open and closed position in synchronization with the displacement or reciprocation of the piston whereby the range of movement between the open and closed position of the gripper fingers is enhanced from the known grippers of comparable size.

IN THE DRAWINGS

DETAIL DESCRIPTION

Figure 1:
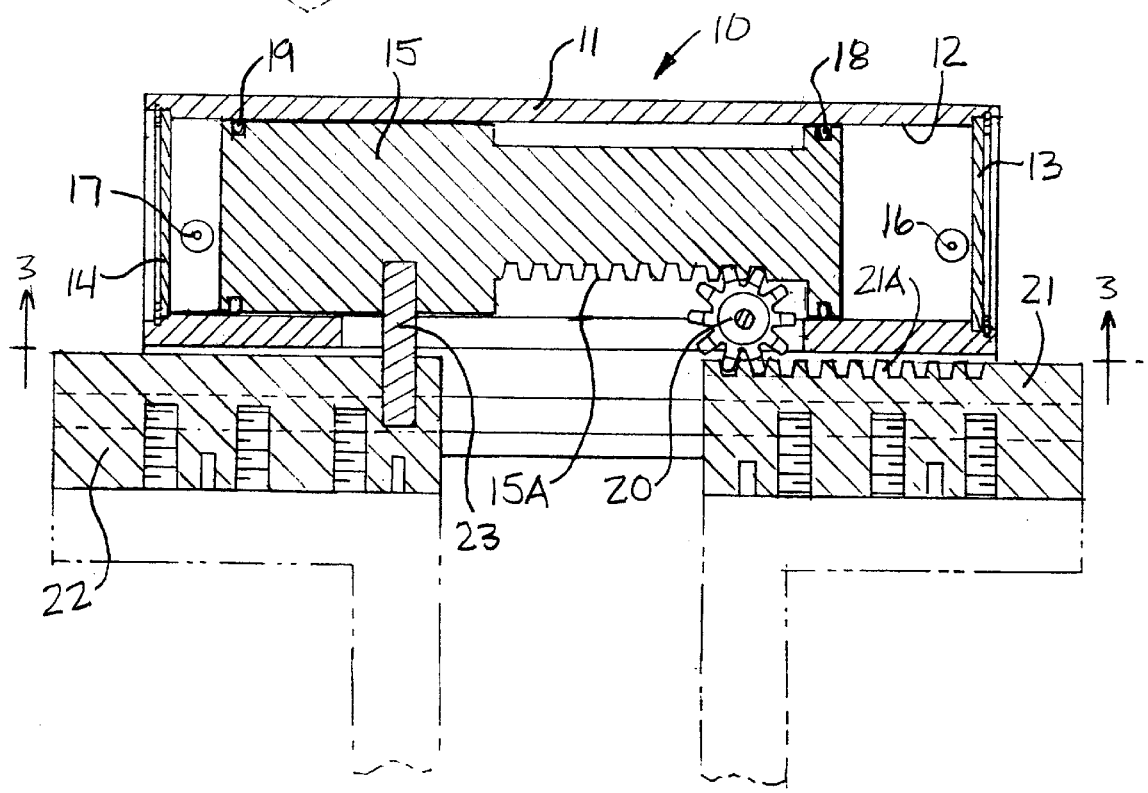
FIG. 1 is a longitudinal sectional view of a gripper embodying the invention.

Referring to FIG. 1, there is disclosed a gripper 10 which includes a housing 11 having a cylinder chamber 12 therein. It will be understood that the cylinder chamber 12 is sealed at both ends by suitable end closures 13 and 14. Slidably disposed within the chamber 12 is a piston 15. In the illustrated embodiment of FIG. 1, the piston 15 is fluid actuated, e.g. by compressed air. An inlet-outlet port 16, 17 is located in the housing 11 at a location on opposite ends of the piston 15 and which ports are disposed in communication to a suitable source of fluid supply and appropriate controls for directing fluid pressure to the respective ports in a well known manner. It will be understood that suitable piston seals 18, 19 are located adjacent each end of the piston 15.

Figure 1A:
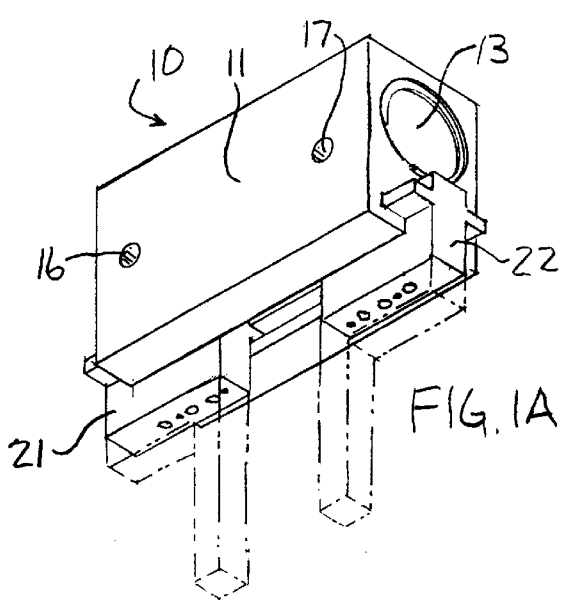
FIG. 1A is a perspective view of the gripper embodying the invention.
Figure 2:
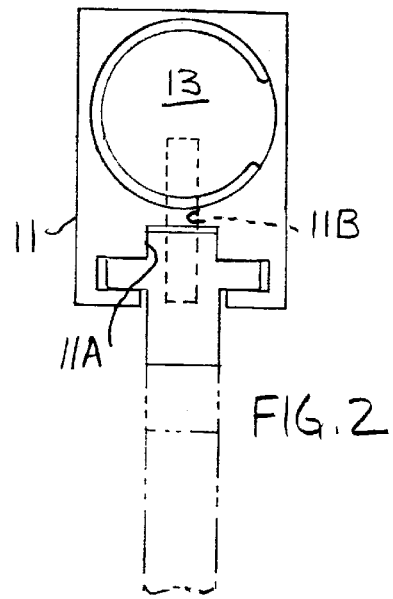
FIG. 2 is a right end view of FIG. 1.

Disposed within the housing 11 is a pinion 20 rotatably journaled therein. The piston 15 is provided with a series of teeth defining a rack 15A disposed in meshing relationship with the idler pinion 20. As shown in FIG. 2, the housing 11 is provided with a longitudinally disposed cruciform slot 11A, in which a pair of opposed finger carriers 21, 22 are reciprocally mounted for movement between a closed and opened position. The respective finger carriers 21, 22 are each provided with a complimentary cruciform shape adapted to be slidably received within slot 11A.

As shown in FIG. 2, one of the finger carriers 21 is provided with a rack portion 21A disposed in meshing relationship with the idler pinion 20. The arrangement is such that the movement of finger carrier 21 is synchronized with the movement of the piston 15.

Figure 3:
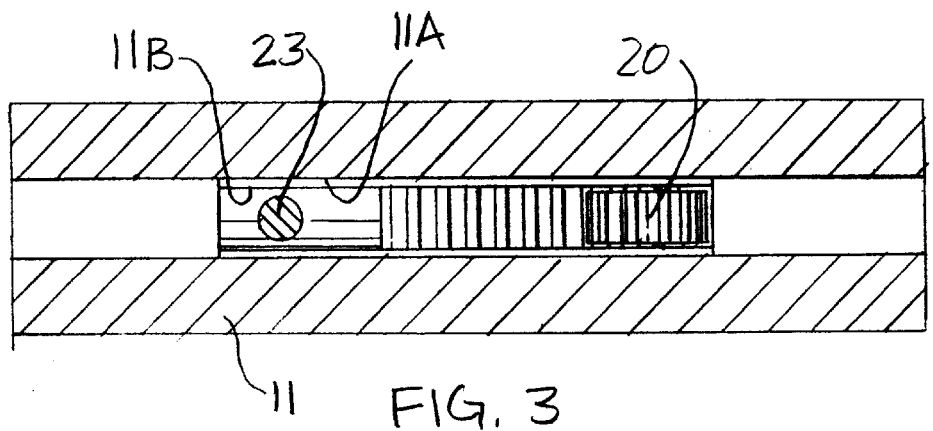
FIG. 3 is a bottom view of FIG. 1.

FIG. 3 illustrates a bottom view of the housing 11 looking upward into the cruciform slot 11A. The upper end of the slot 11A, as best seen in FIG. 2 and as seen in FIG. 3, is provided with an elongated opening 11B.

According to this invention, the piston 15 is provided with a lateral extending pin 23 which extends through opening 11B to connect with the other finger carrier 22. Thus, it will be apparent that the finger carrier 22 is fixedly connected to the piston 15 to move therewith toward or away from the other finger carrier 21 as the piston 15 is displaced in one direction or the other. The arrangement is such that the range of opening between the respective finger carriers 21 and 22 is enhanced for a given size housing; all other things being equal.

In operation, when a fluid medium, e.g. compressed air, is introduced into port 16, the fluid pressure acting on piston 15 will force the piston to the left as viewed in FIG. 1, causing the finger carrier to the opened position. The air in the chamber on the other end of the piston 15 is exhausted through port 17. As the piston 15 is displaced toward the open position, i.e. shifted left as seen in FIG. 1, the finger carrier 22 tied to piston 15 by pin 23 is shifted to the left. Thus, as viewed in FIG. 1, the finger carriers 21 and 22 are shown in their maximum open position.

When air is introduced into port 17, the action of the piston 15 is reversed, i.e. shifted to the right as viewed in FIG. 1. In doing so, the respective finger carriers 21, 22 are shifted in unison toward one another to a closed position.

Thus, both finger carriers 21, 22 are synchronized to the movement of the piston 15; one finger carrier 21 being synchronized by the action of the pinion 20 and the other finger carrier 22 by the direct connection afforded by the pin 23.

Figure 4:
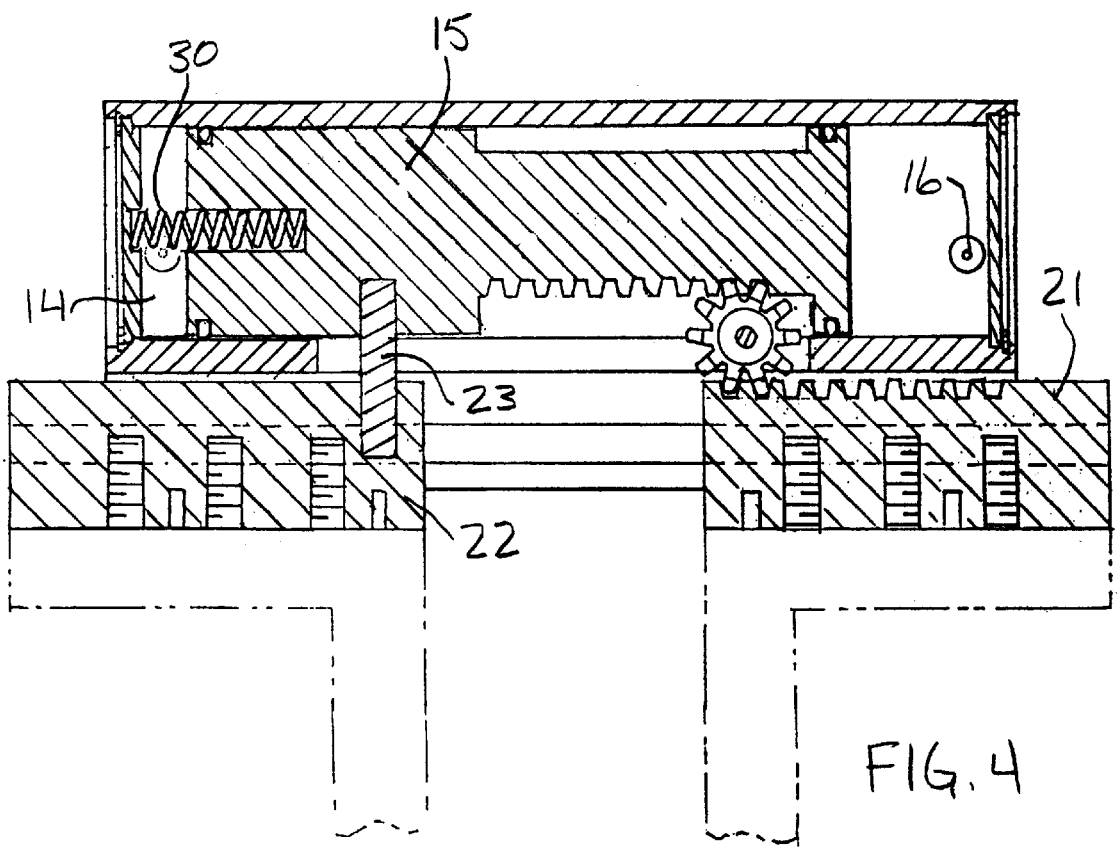
FIG. 4 is a longitudinal sectional view of a modified embodiment.

FIG. 4 illustrates another embodiment of this invention. The embodiment of FIG. 4 is identical to that herein described except that a spring 30 is acting on the piston 15 to morally return the respective finger carriers toward closed position when the fluid pressure acting on the other end of the piston is released. In this form of the invention, fluid pressure, e.g. compressed air, is introduced into port 16 to effect displacement of the piston 15 to the left as viewed in FIG. 4. In doing so, the respective finger carriers are moved toward the open position as shown in FIG. 4. Also, the spring 30 biased between the other end of the piston 15 and the adjacent end seal is compressed. As soon as the fluid pressure acting on the other end of the piston 15 is released, the spring 30 functions to shift the piston to the right, causing the respective finger carriers 21 and 22 to move toward their closed position.

In the disclosed embodiments, enhanced accuracy can be achieved by maintaining a close to zero tolerance between the sliding surfaces of the cruciform slot 11A with the corresponding surfaces of the cruciform finger carriers 21, 22 disposed in sliding relationship therewith.

While the present invention has been described with respect to a particular embodiment, modifications and variations may be made without departing from the spirit and scope of this invention.

What is claimed is:

1. A gripper comprising:

a housing;

a cylindrical bore disposed within said housing;

a piston reciprocally mounted within said bore;

said piston having a rack portion;

an idler pinion rotatably mounted within said housing and in meshing relationship with said rack portion;

a longitudinal slot formed in said housing;

said slot being disposed in parallel relative to said cylinder bore;

a pair of finger carriers slidably disposed in said slot for movement toward and away from one another;

one of said finger carriers having a rack in meshing relationship with said idler pinion;

and a connector connecting the other of said finger carriers to said piston whereby the displacement of said piston effects the translation of said finger carriers toward and away from one another.

2. A gripper as defined in claim 1 wherein said slot is cruciform in cross-section;

and each of said finger carriers has a complimentary cruciform cross-section slidably disposed within said cruciform slot.

3. A gripper as defined in claim 1 and including means for introducing a fluid pressure on the opposed ends of said piston for effecting the displacement of said piston within said cylinder bore.

4. A gripper as defined in claim 1 and including a means for introducing a fluid pressure on one end of said piston;

and a spring biasing the other end of said piston.

5. A gripper comprising:

a housing;

a cylindrical bore extending through said housing;

opposed end closures sealing the ends of said cylindrical bore;

a piston slidably disposed within said cylindrical bore;

said piston having a rack portion;

a cruciform slot extending parallel to the axis of said cylindrical bore;

an idler pinion disposed within said housing between said cylindrical bore and said cruciform slot;

said idler pinion being disposed in meshing relationship with said piston rack portion;

a pair of finger carriers slidably disposed within said cruciform slot;

one of said finger carriers having a rack disposed in meshing relationship with said idler pinion;

and a pin connecting the other of said pair of finger carriers to said piston whereby the reciprocation of said piston within said cylindrical bore effects the displacement of said finger carriers toward and away from one another to define a closed and open position.

6. A gripper comprising:

a housing of a predetermined size;

a cylindrical bore disposed within said housing;

a piston having a rack portion reciprocally disposed within said cylinder bore;

an idler pinion in meshing relationship with said rack portion;

a pair of finger carriers reciprocally mounted on said housing for movement between an open and closed position wherein one of said finger carriers is in meshing relationship with said idler pinion and the other finger carrier is fixedly connected to said piston.

7. A gripper as defined in claim 6 wherein said one of said finger carriers is synchronized to move in a direction opposite to the movement of said piston and said other finger carrier is arranged to shift in unison with said piston.

8. A gripper as defined in claim 6 and including means for introducing a fluid pressure on each end of said piston to effect the reciprocation of said piston within said cylinder bore.

9. A gripper as defined in claim 6 and including a means for introducing a fluid pressure only on one end of said piston to reciprocate said piston in one direction;

and a spring biasing the other end of said piston for shifting said piston in the opposite direction.

* * * * *